United States Patent [19]

Hofmann et al.

[11] Patent Number: 5,738,180

[45] Date of Patent: Apr. 14, 1998

[54] FOOTBOARD ASSEMBLY

[75] Inventors: James L. Hofmann, Mukwonago; Roy Rosario, Waterford, both of Wis.

[73] Assignee: Harley-Davidson Motor Company, Milwaukee, Wis.

[21] Appl. No.: 699,013

[22] Filed: Aug. 16, 1996

Related U.S. Application Data

[63] Continuation-in-part of Ser. No. 505,801, Jul. 21, 1995, abandoned.

[51] Int. Cl.$^6$ ............................. B62J 25/00; G05G 1/18
[52] U.S. Cl. .................. 180/291; 280/169; 280/291; 74/564
[58] Field of Search ........................ 280/291, 169, 280/87.042; 180/291; 74/564

[56] References Cited

U.S. PATENT DOCUMENTS

| | | | |
|---|---|---|---|
| 1,601,708 | 9/1926 | Thomas | 74/563 |
| 1,625,187 | 4/1927 | Birch | 280/169 |
| 1,784,781 | 12/1930 | Bronson | 280/169 |
| 1,907,689 | 5/1933 | Vrooman | 280/169 |
| 1,979,861 | 11/1934 | Bullock | 280/291 |
| 2,021,522 | 11/1935 | Schacht | 280/169 |
| 2,057,873 | 10/1936 | Atwood | 280/169 |
| 4,174,852 | 11/1979 | Panzica et al. | 280/291 |
| 4,546,993 | 10/1985 | Walker | 280/291 |
| 4,681,333 | 7/1987 | Rouge et al. | 280/87.04 A |
| 4,802,684 | 2/1989 | Bennett et al. | 280/291 |

OTHER PUBLICATIONS

Custom Chrome, Inc. Sales catalog, Floorboard Pads and Kits pp. 97–99, 1995.
Drag Specialties Sales catalog, Brakes, pp. 418, 1995.
Drag Specialties Sales catalog, Chassis, Suspension, Fenders & Footpegs, pp. 489–492, 1995.
Custom Chrome, Inc. Sales catalog, Floorboard Pads and Kits pp. 97–99, Jan. 1995.

*Primary Examiner*—Brian L. Johnson
*Assistant Examiner*—Bridget Avery
*Attorney, Agent, or Firm*—Michael, Best & Friedrich LLP

[57] ABSTRACT

A footboard assembly including a resilient pad having a planar portion and a lip portion extending outward from the planar portion, and a cover member position over the resilient pad. The lip portion extends laterally outward further than an outer perimeter of the cover member. The cover member includes a plurality of openings, and the resilient pad includes a plurality of raised portions extending upward from the planar portion and through the openings. Shaker mounts are formed integrally with the resilient pad to provide vibration damping between the motorcycle platform and the footboard assembly. A substantially rigid insert is molded into the planar portion of the resilient pad. A thin layer of resilient material is positioned under the insert to completely enclose the insert.

18 Claims, 4 Drawing Sheets

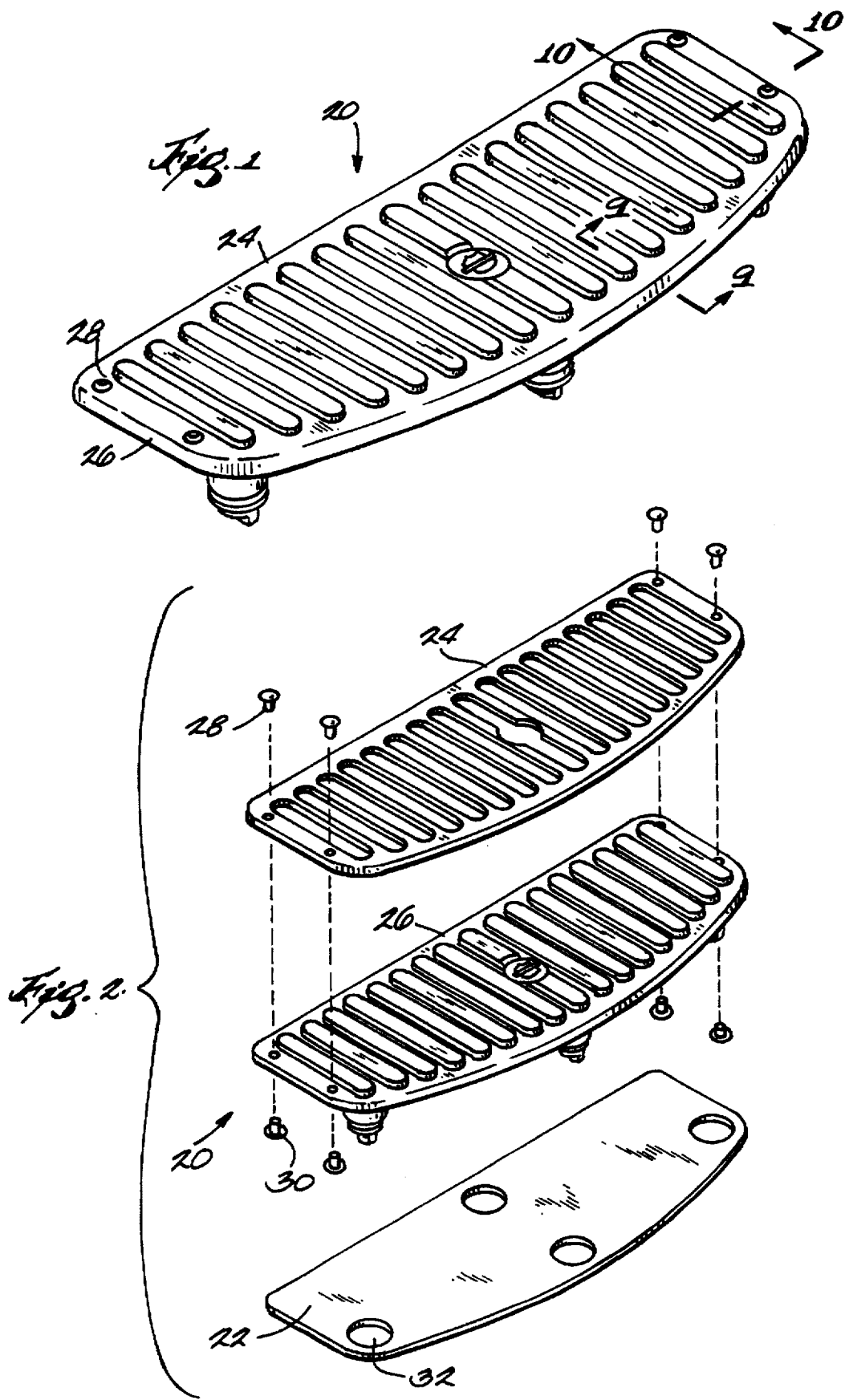

FOOTBOARD ASSEMBLY

This is a continuation-in-part of application Ser. No. 08/505,801, filed Jul. 21, 1995, entitled "FOOTBOARD ASSEMBLY", now abandoned.

FIELD OF THE INVENTION

The present invention generally relates to the field of footboards for motor vehicles (e.g., motorcycles). More specifically, the present invention relates to footboards having resilient pads for improved friction and vibration damping.

BACKGROUND OF THE INVENTION

Footboards on motorcycles provide a place for operators and passengers to place their feet when riding the motorcycle. Typically, the operator footboards are located adjacent to a brake pedal and shift levers so that the operator can perform the necessary braking and shifting functions for operating the motorcycle. Passenger footboards are often designed to be pivotable from a horizontal operative position to a vertical inoperative position so that the passenger footboards can be pivoted out of the way when not being utilized.

Both operator and passenger footboards typically comprise a resilient pad secured to a rigid platform. The resilient pad member can comprise a resilient material, such as rubber, and the rigid platform typically comprises metal, such as aluminum or steel. The resilient pad provides a high-friction surface to improve frictional contact between the footboard and the operator's foot, and further assists in dampening vibration traveling from the motorcycle to the operator's or passenger's feet. To further improve vibration damping, some footboards utilize vibration-dampening mounts (e.g., spherical rubber members) positioned between the resilient pad and the rigid platform.

To improve the overall aesthetics of the motorcycle, some footboards include a rigid (e.g., metal) cover placed over the resilient pad. The rigid cover includes a plurality of longitudinal openings that insertably receive a plurality of corresponding raised portions. A rigid (e.g., metal) base is positioned under the resilient pad, and is secured to the rigid cover to thereby sandwich the resilient pad therebetween. The resulting footboard assembly is secured to the rigid platform either rigidly or through vibration-dampening mounts. Such a footboard assembly is sold by Custom Chrome of Morgan Hill California.

One problem with the above-described footboard assembly is that, due to the number of exposed metal parts, there tends to be a lot of rattling caused by the vibration of the motorcycle. Such exposed metal parts also tend to be the target of corrosion over time. In addition, the above-described footboard assembly requires many parts to form an assembly that can be secured to a platform.

SUMMARY OF THE INVENTION

It is an object of the present invention to provide a footboard assembly that requires the use of less parts. It is another object to provide a footboard assembly that reduces the amount of exposed metal parts, thereby reducing rattling and corrosion problems.

The footboard assembly of the present invention includes a resilient pad having a planar portion and a lip portion extending outward from the planar portion, and a cover member position over the resilient pad. The lip portion extends laterally outward further than an outer perimeter of the cover member to thereby inhibit contact between the cover member and any other metal parts, such as the platform to which the footboard assembly is secured during use.

In one embodiment, the cover member includes an opening, and the resilient pad includes a raised portion extending upward from the planar portion and through the opening. Preferably, the cover member includes a plurality of openings, and the resilient pad includes a plurality of raised portions extending upward from the planar portion and through the openings. Preferably, a shaker mount is secured to the resilient pad to provide vibration damping between the motorcycle platform and the footboard assembly.

A substantially rigid insert can be advantageously secured to the planar portion of the resilient pad. Preferably, the insert is molded into the resilient pad. When molded into the resilient pad, a thin layer of resilient material is preferably positioned under the insert to completely enclose the insert. Such a design protects the insert from corrosion and enhances vibration isolation.

Preferably, the cover member is secured to the resilient pad utilizing a fastener (e.g., a rivet and eyelet combination). For example, the fastener can extend through a hole in the insert. In one embodiment, the hole is lined with a resilient material to isolate the fastener from the cover member.

The present invention is also embodied in a method of making a footboard assembly. The method includes the steps of forming a resilient pad having a planar portion and a lip portion extending outward from the planar portion, forming a cover member to be positioned over the resilient pad, engaging the resilient pad with the cover member, and securing the cover member to the resilient pad to form a footboard assembly. In one embodiment, the step of engaging includes the step of inserting a raised portion of the resilient pad through an opening in the cover member. Preferably, the method also includes the step of forming a shaker mount integral with the resilient pad. A substantially rigid insert can be secured to (e.g., molded into) the planar portion of the resilient pad to add stability to the resilient pad.

BRIEF DESCRIPTION OF THE DRAWINGS

FIG. 1 is a perspective view of a footboard assembly embodying the present invention.

FIG. 2 is an exploded assembly view of the footboard assembly illustrated in FIG. 1.

DETAILED DESCRIPTION

Figure 3:
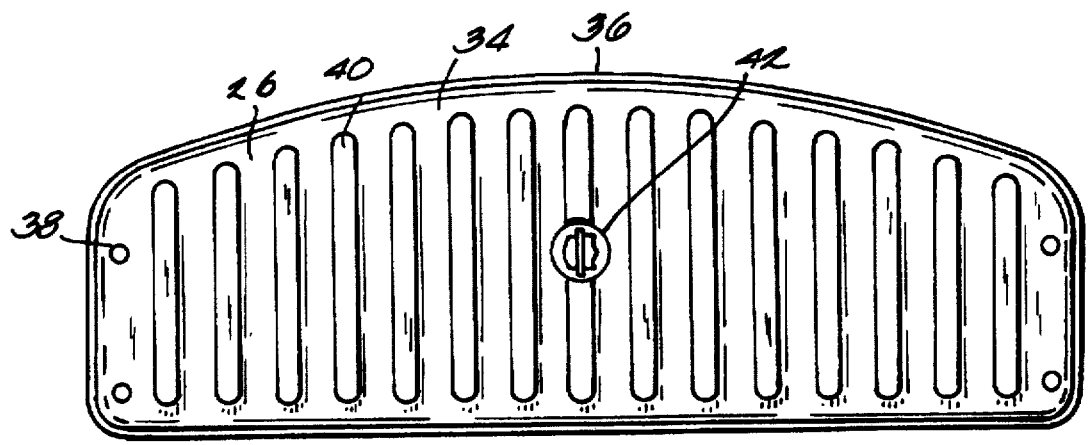
FIG. 3 is a top view of the resilient pad of the footboard assembly illustrated in FIG. 1.

FIG. 1 illustrates a footboard assembly 20 embodying the features of the present invention. An exploded assembly view of the assembly, and its interaction with a platform 22 on the motorcycle (not shown), is illustrated in FIG. 2. The footboard assembly 20 generally comprises a cover member 24 secured to a resilient pad 26 utilizing four rivets 28 and four corresponding eyelets 30. The complete assembly is designed to be inserted into four apertures 32 in the platform 22, as will be described below in more detail.

Figure 4:
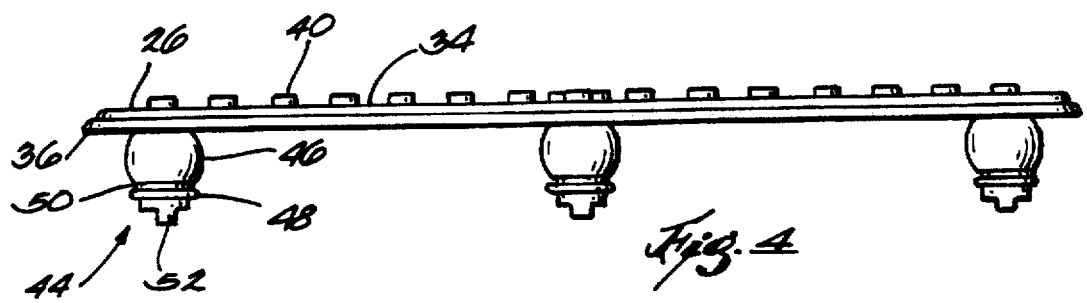
FIG. 4 is a side view of the resilient pad illustrated in FIG. 3.
Figure 5:
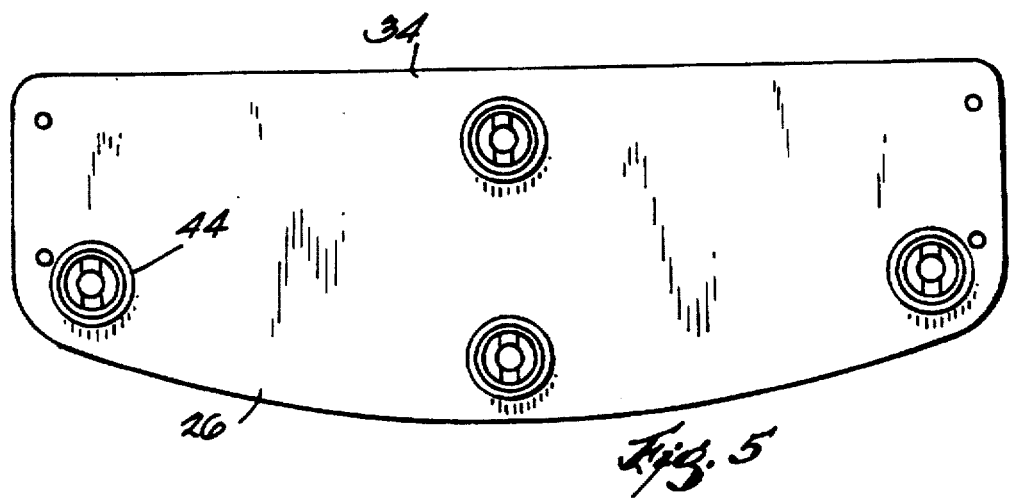
FIG. 5 is a bottom view of the resilient pad illustrated in FIG. 3.

Referring to FIGS. 3-5, the resilient pad 26 includes a generally planar portion 34 having a lip portion 36 extending around the perimeter thereof. The planer portion includes four holes 38 for insertably receiving the rivets 28 and corresponding eyelets 30. A plurality of longitudinally-extending raised portions 40 extend upwardly from the planar portion 34. The center of the planar portion 34 includes a circular logo portion 42 for displaying a logo or trademark of the manufacturer of the footboard assembly 20. Four downwardly-depending shaker mounts 44 are secured to a lower surface of the planar portion 34. The shaker mounts 44 each include a spherical portion 46 for providing vibration dampening between the resilient pad 26 and the motorcycle platform 22. A circumferential ledge 48 defines a circumferential groove 50 designed to be inserted into and engage the apertures 32 in the motorcycle platform 22. Each shaker mount 44 further includes two downwardly-extending bosses 52 designed to facilitate insertion of the shaker mounts 44 into the apertures 32 of the motorcycle platform 22. For example, the bosses 52 can be engaged using a pliers to pull the circumferential ledge 48 through the aperture 32 in the platform 22.

Figure 6:
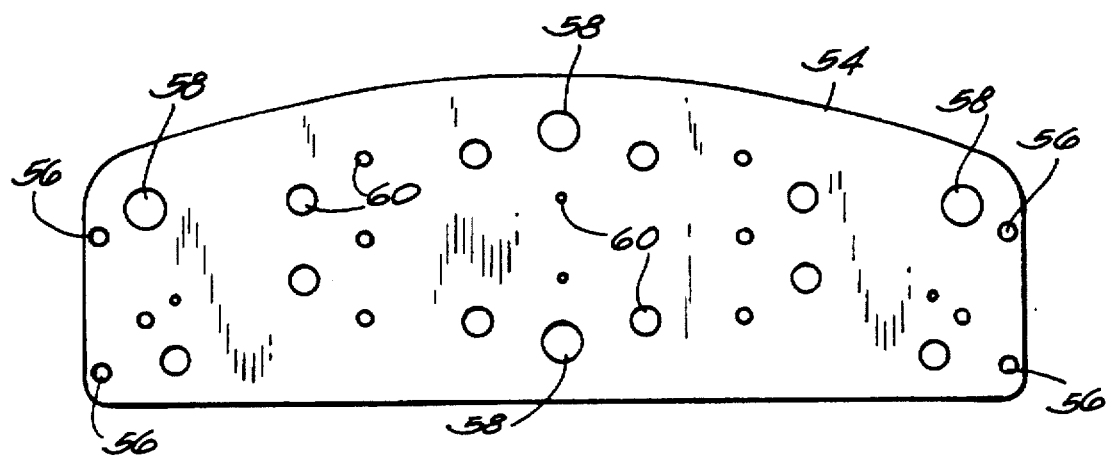
FIG. 6 is a top view of the rigid insert used to make the resilient pad illustrated in FIGS. 3–5.

The above-described resilient pad 26 is molded as a single unit using a rubber material. To provide rigidity, a rigid insert 54 is molded into the resilient pad 26, as shown in FIG. 6. The rigid insert 54 of the illustrated embodiment is a thin sheet of steel having a shape that generally corresponds with the shape of the planar portion 34 of the resilient pad 26. The rigid insert 54 includes four small holes 56 that are aligned with the four holes 38 of the resilient pad 26 for insertably receiving the rivets 28 and corresponding eyelets 30. The rigid insert 54 further includes four large holes 58 for facilitating the formation of the four shaker mounts 44. In addition, the rigid insert 54 includes a plurality of other holes 60 to enhance the bond between the rigid insert 54 and the rubber material of the resilient pad 26. When molding the rigid insert 54 into the resilient pad 26, a thin layer 62 (FIGS. 9 and 10) of about 0.1-0.25 mm of rubber is formed underneath the rigid insert 54 to thereby completely seal the rigid insert 54 within the resilient pad 26. In addition, each of the above-mentioned small holes 56 is lined with a thin layer of rubber (not illustrated) to isolate the rigid insert 54 from potentially-corrosive elements, such as salt and moisture.

Figure 7:
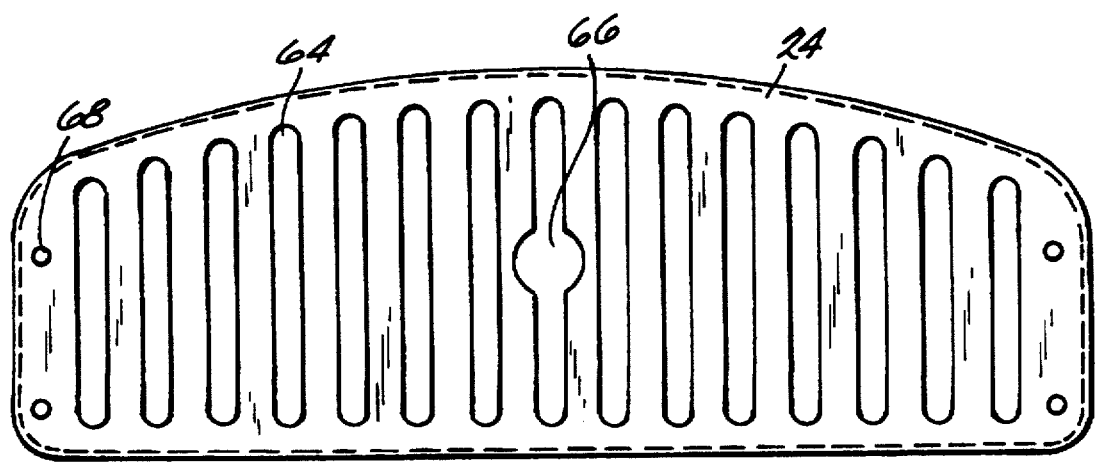
FIG. 7 is a top plan view of the rigid cover used to make the footboard assembly illustrated in FIG. 1.
Figure 8:
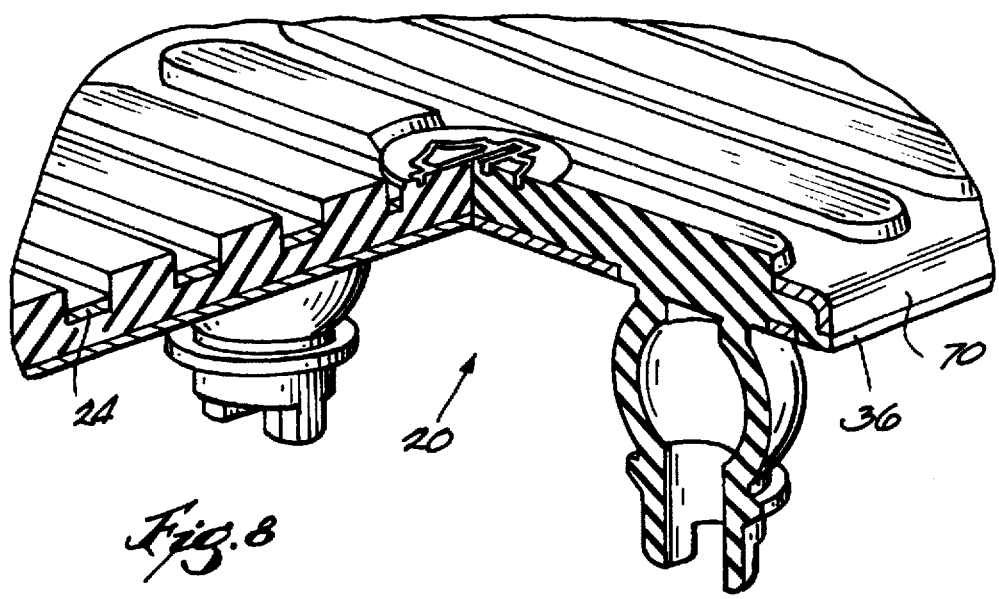
FIG. 8 is a perspective section view of the footboard assembly illustrated in FIG. 1.
Figure 9:
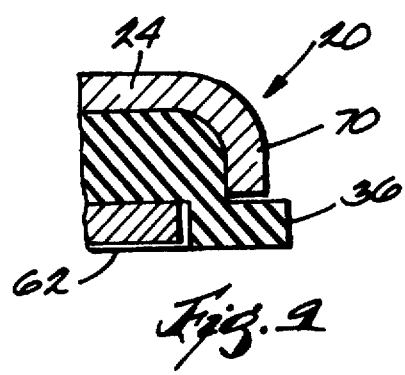
FIG. 9 is a section view taken along line 9—9 in FIG. 1.
Figure 10:
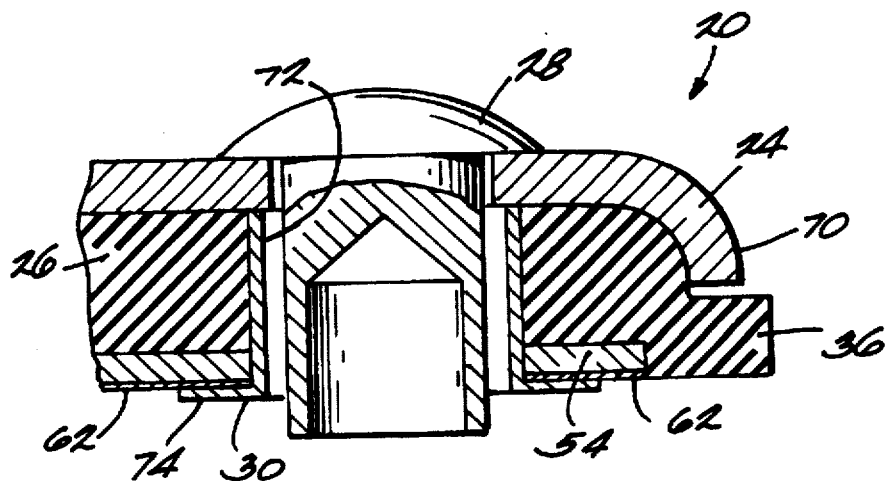
FIG. 10 is a section view taken along line 10—10 in FIG. 1.

FIG. 7 illustrates a top view of the cover member 24 illustrated in FIG. 1. The cover member 24 includes a plurality of longitudinally-extending openings 64 that are dimensioned to insertably receive the raised portions 40 of the resilient pad 26. In addition, the cover member 24 includes a circular opening 66, integral with the center longitudinally-extending opening, for insertably receiving the logo portion 42 of the resilient pad 26. Four holes 68 are provided on the cover member 24 for insertably receiving the four rivets 28. Referring to FIGS. 8-10, the cover member 24 includes a downwardly-depending skirt portion 70 extending around the perimeter of the base portion.

FIGS. 8-10 illustrate various section views of the complete footboard assembly 20. An important aspect of the assembly is the fact that the lip portion 36 of the resilient pad 26 extends laterally outward beyond the outer edge of the skirt portion 70 of the cover member 24. By virtue of such positioning of the lip portion 36, the cover member 24 is isolated from the motorcycle platform 22 (not illustrated in FIGS. 8-10) to which the footboard assembly 20 is secured. Accordingly, lateral movements of the footboard assembly 20 will be absorbed by the lip portion 36 of the resilient pad 26, rather than by contact between the metal cover member 24 and the metal platform 22. In addition, it is emphasized that there is a thin layer 62 of rubber material underneath the rigid insert 54, thereby providing further isolation between the metal insert and the motorcycle platform 22.

Referring specifically to FIG. 10, each of the eyelets 30 extends through the resilient pad 26 an associated rigid insert 54. The eyelet 30 includes a shaft portion 72 that contacts the cover member 24, and a head portion 74 that extends laterally from the shaft portion 72 to secure the eyelet 30 to the resilient pad 26. The rivet 28 (illustrated in the unexpanded condition) is used to secure the eyelet 30 against the cover member 24.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A footboard assembly for securing to a motorcycle, comprising:

a platform;

a resilient pad having a planar portion and a lip portion extending outward from said planar portion;

a shaker mount integrally formed with said resilient pad, said shaker mount being positioned between said resilient pad and said platform, said platform being mounted in a groove of said shaker mount such that said resilient pad is mounted in spaced relation to said platform; and a cover member positioned over said resilient pad, wherein said lip portion extends laterally outward further than an outer perimeter of said cover member such that said cover member is substantially prevented from contacting said platform.

2. A footboard assembly as claimed in claim 1, wherein said cover member includes an opening, and wherein said resilient pad includes a raised portion extending upward from said planar portion and through said opening.

3. A footboard assembly as claimed in claim 1, wherein said cover member includes a plurality of openings, and wherein said resilient pad includes a plurality of raised portions extending upward from said planar portion and through said openings.

4. A footboard assembly as claimed in claim 1, further comprising a substantially rigid insert secured to said planar portion of said resilient pad.

5. A footboard assembly as claimed in claim 4, wherein said insert is molded into said planar portion of said resilient pad.

6. A footboard assembly as claimed in claim 1, further comprising a fastener interconnecting said cover member with said resilient pad.

7. A footboard assembly for securing to a motorcycle, comprising:
   a resilient pad having a planar portion;
   a substantially rigid insert molded into said resilient pad such that said rigid insert is substantially completely sealed within said resilient pad, a shaker mount integrally formed with said resilient pad, said shaker mount being positioned between said resilient pad and said platform; said platform being mounted in a groove of said shaker mount such that said resilient pad is mounted in spaced relation to said platform; and
   a cover member positioned over said resilient pad.

8. A footboard assembly as claimed in claim 7, wherein said cover member include an opening, and wherein said resilient pad includes a raised portion extending upward from said planar portion and through said opening.

9. A footboard assembly as claimed in claim 7, wherein said cover member includes a plurality of openings, and wherein said resilient pad includes a plurality of raised portions extending upward from said planar portion and through said openings.

10. A footboard assembly as claimed in claim 7, further comprising a platform and a shaker mount integrally formed with said resilient pad, said shaker mount being positioned between said resilient pad and said platform such that said resilient pad is mounted in spaced relation to said platform.

11. A footboard assembly as claimed in claim 7, further comprising a fastener interconnecting said cover member with said resilient pad.

12. A footboard assembly as claimed in claim 7, wherein said fastener extends through a hole in said insert.

13. A footboard assembly as claimed in claim 12, wherein said hole is lined with a resilient material.

14. A footboard assembly as claimed in claim 7, wherein a portion of said resilient pad forms a thin layer of resilient material under said insert.

15. A method of making a footboard assembly comprising the steps of:
   forming a resilient pad having a planar portion and a lip portion extending outward from the planar portion;
   forming a cover member to be positioned over the resilient pad, the cover member having an outer periphery;
   engaging the resilient pad with the cover member;
   securing the cover member to the resilient pad to form a footboard assembly with the lip portion extending outward beyond the outer periphery of the cover member; forming a shaker mount integral with the resilient pad; said shaker mount having a groove;
   providing a platform; and
   engaging said platform with said groove in said shaker mount.

16. A method as claimed in claim 15, wherein the cover member include an opening, wherein the resilient pad includes a raised portion, and wherein said step of engaging comprises the step of inserting the raised portion of the resilient pad through the opening in the cover member.

17. A method as claimed in claim 15, further comprising the step of securing a substantially rigid insert to the planar portion of the resilient pad.

18. A method as claimed in claim 17, wherein said step of securing comprises the step of molding the insert into the planar portion of the resilient pad.

* * * * *